Figure 1:
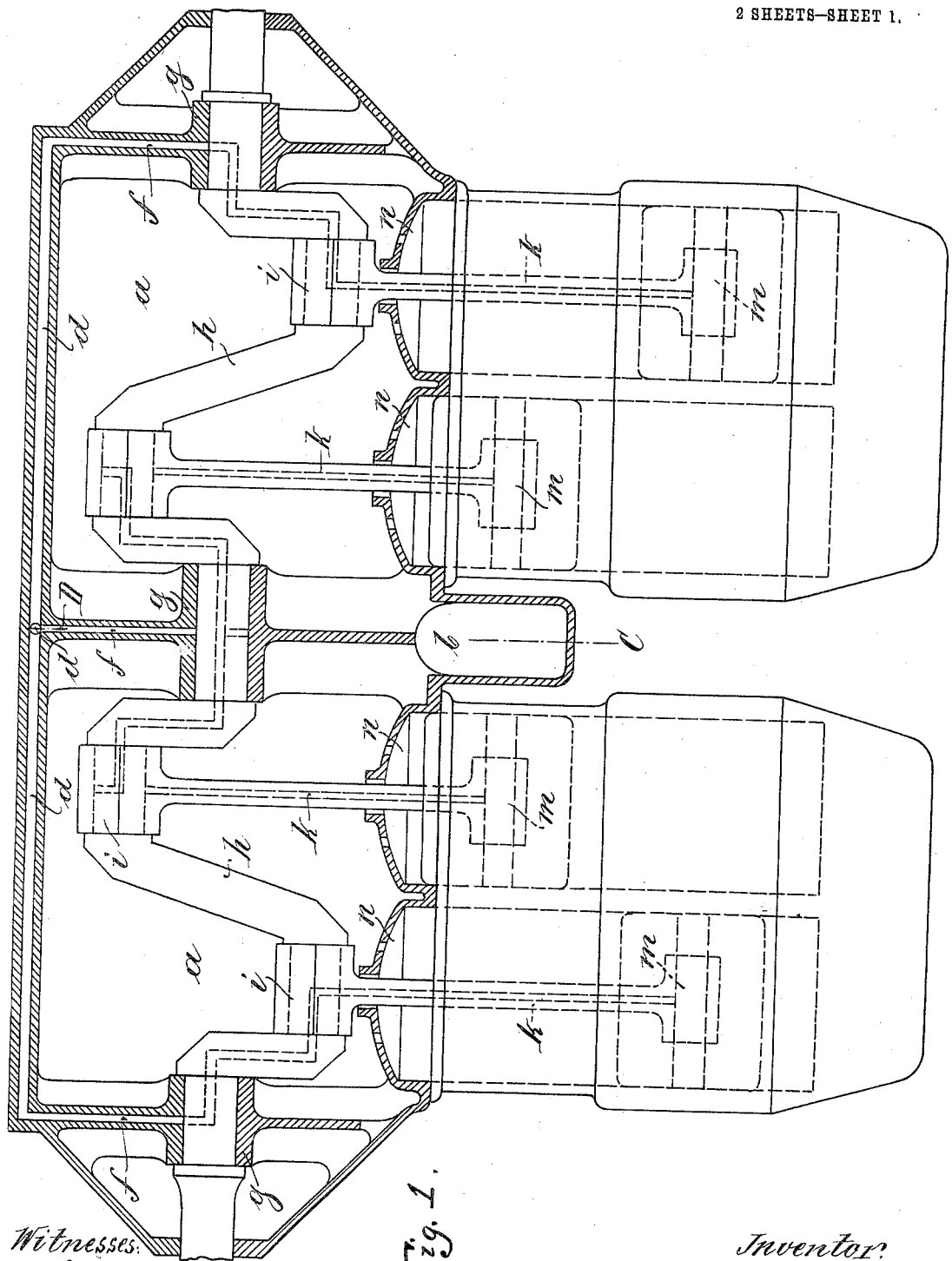

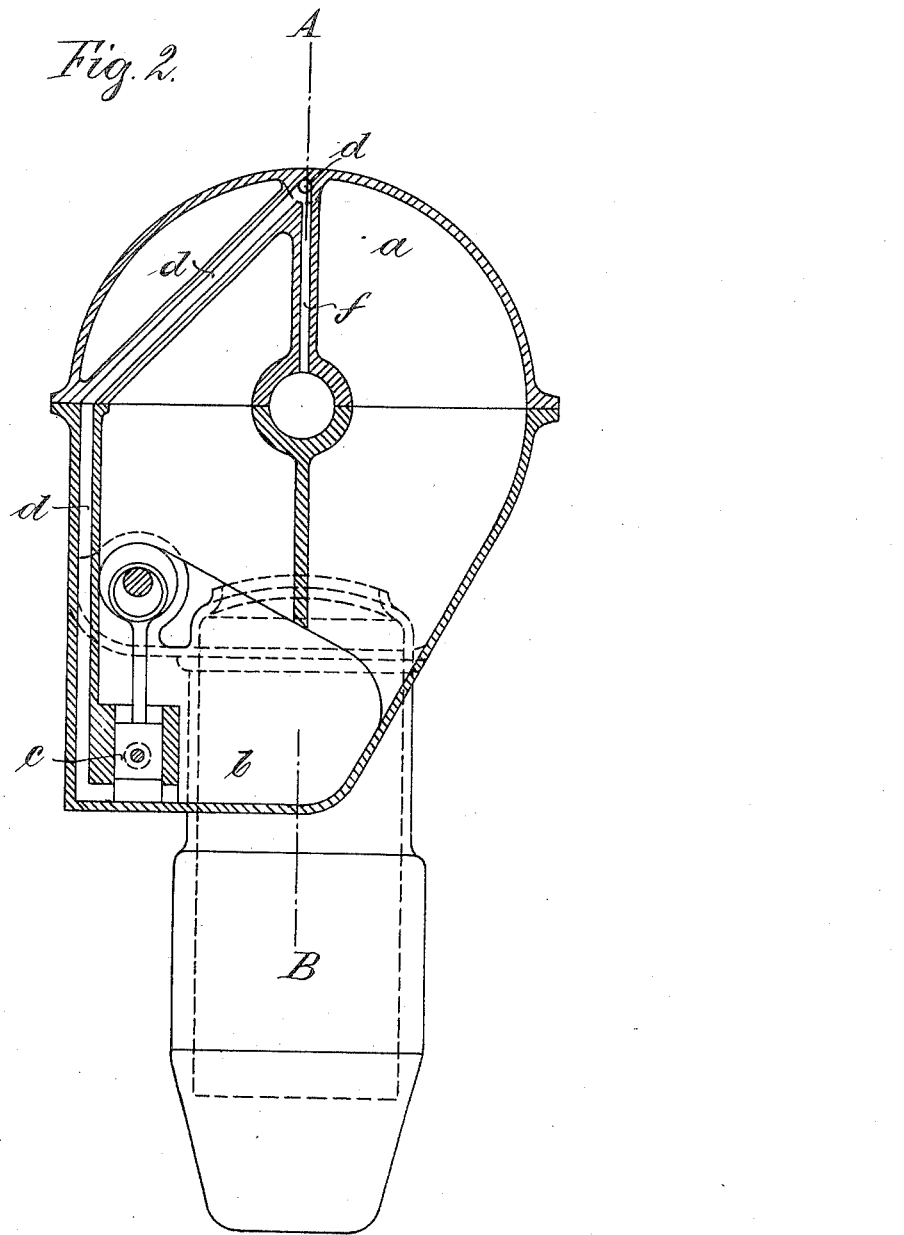

UNITED STATES PATENT OFFICE.

PAUL DAIMLER, OF CANNSTATT, GERMANY, ASSIGNOR TO THE FIRM OF DAIMLER-MOTOREN-GESELLSCHAFT, OF UNTERTURKHEIM, GERMANY.

OIL-CIRCULATORY LUBRICATING SYSTEM.

1,098,784.  Specification of Letters Patent.  Patented June 2, 1914.

Application filed November 17, 1913. Serial No. 801,509.

*To all whom it may concern:*

Be it known that I, PAUL DAIMLER, a subject of the King of Wurttemberg, residing at 87 Waiblingerstrasse, Cannstatt, in the Kingdom of Wurttemberg, German Empire, have invented certain new and useful Improvements in Oil-Circulatory Lubricating Systems, of which the following is a specification.

This invention relates to an oil-circulatory lubricating system for suspended internal combustion engines, that is to say, engines of the type in which the crank shaft is arranged above the cylinders, the object of the present invention being to obviate the danger of the motive power being adversely affected by the excessive supply of lubricating oil and to obviate waste of lubricating oil.

According to the present invention, covers through which the piston rods pass are arranged between the cylinders and the superposed crank chamber, and below the covers a reservoir opening into the crank chamber is provided for the oil leaving the lubricated parts. The oil which flows from the bearings is then collected in the low-lying reservoir and immediately circulated again by the circulating pump, so that an oil pump proper such as in internal combustion engines having upright cylinders, is not required. The engine cylinders which are closed above by the covers are chiefly lubricated by means of the oil particles which are contained in the air saturated with oil.

In order that the invention may be more clearly understood, reference is made to the accompanying drawings, showing one embodiment thereof by way of example.

Figure 1 is a vertical section on the line A—B of Fig. 2, and Fig. 2 is a section at right angles to Fig. 1 on the line C—D thereof.

Opening into the crank chamber *a* and arranged between the pairs of cylinders is a reservoir *b* in which the oil running from the crank shaft bearings and from the crank pins is collected. In this reservoir is arranged an oil pump *c* which forces the oil through the passages *d* and *f* to the crank shaft bearings *g*. The crank shaft *h* is bored internally so that the lubricating oil passes through the passages in the crank shaft to the crank pin bearings *i*, from whence it flows through passages in the piston rods *k* to the bearings *m* of the piston bolts.

Within the crank chamber the cylinders are provided with covers *n* which leave sufficient clearance for the piston rods to pass through and for the necessary oil to reach the cylinders, while simultaneously the admission and exit of air to the spaces above the pistons is possible. The arrangement can, of course, also be employed in order to suck fresh oil from a suitable vessel and supply it to the parts to be lubricated.

I claim:—

1. In an oil-circulatory lubricating system for suspended internal combustion engines, a crank chamber above the engine cylinders, covers arranged between said cylinders and crank chamber through which the piston rods pass, and a reservoir beneath said covers and opening into said crank chamber for receiving the lubricating oil therein.

2. In an oil-circulatory lubricating system for suspended internal combustion engines, a crank chamber above the engine cylinders, covers arranged between said cylinders and crank chamber through which the piston rods pass, a reservoir beneath said covers and opening into said crank chamber for receiving the lubricating oil therein, and an oil-circulating pump for supplying the oil in said reservoir to the parts to be lubricated.

3. In combination with a multi-cylinder internal combustion engine of the inverted cylinder type, an inclosed crank chamber above the cylinders having orifices opening into said cylinders, an oil reservoir below and opening into said crank chamber and an oil circulating device in said reservoir.

4. In combination with a multi-cylinder internal combustion engine of the inverted cylinder type having the crank shaft located above the cylinders, a chamber for collecting the oil dripping from said crank shaft, an oil reservoir to which the oil is supplied from said chamber and an oil circulating device in said reservoir.

In testimony whereof I have affixed my signature in presence of two witnesses.

PAUL DAIMLER.

Witnesses:
 ROBERT UHLAND,
 ERNEST ENTENMANN.